United States Patent [19]
Lee et al.

[11] Patent Number: 5,387,619
[45] Date of Patent: Feb. 7, 1995

[54] CHEMICAL REACTION SUPPRESSION SYSTEM

[75] Inventors: Chinsoo Lee, Charleston; Kenneth L. Hoy, St. Albans, both of W. Va.

[73] Assignee: Union Carbide Chemicals & Plastics Technology Corporation, Danbury, Conn.

[21] Appl. No.: 93,308

[22] Filed: Jul. 16, 1993

Related U.S. Application Data

[63] Continuation of Ser. No. 676,074, Mar. 27, 1991.
[51] Int. Cl.$^6$ ............................................. C08G 18/08
[52] U.S. Cl. .................................. 521/133; 521/155; 528/48; 528/76; 528/83; 252/183.12; 264/51; 264/328.1; 264/328.6; 264/328.8
[58] Field of Search ............... 521/133, 155; 528/48, 528/76, 83; 252/183.12; 264/51, 328.1, 328.6, 328.8

[56] References Cited

U.S. PATENT DOCUMENTS

| | | | |
|---|---|---|---|
| 4,124,528 | 11/1978 | Modell | 252/411 |
| 4,189,914 | 2/1980 | Marek et al. | 60/726 |
| 4,375,387 | 3/1983 | deFilippi et al. | 202/169 |
| 4,582,731 | 4/1986 | Smith | 427/421 |
| 4,619,735 | 10/1986 | Norton | 162/135 |
| 4,734,227 | 3/1986 | Smith | 264/13 |
| 4,734,451 | 3/1986 | Smith | 524/493 |
| 4,737,384 | 4/1988 | Murthy et al. | 427/421 |
| 4,882,107 | 11/1989 | Cavender et al. | 264/51 |
| 4,906,672 | 3/1990 | Stone et al. | 264/50 |
| 4,923,720 | 5/1980 | Lee | 427/422 |

FOREIGN PATENT DOCUMENTS

| | | | |
|---|---|---|---|
| 2603664 | 8/1977 | Germany | B65B 31/02 |
| 2853066 | 6/1980 | Germany | B05D 1/22 |
| 55-84328 | 6/1980 | Japan | C08J 2/02 |
| 58-168674 | 10/1983 | Japan | C09J 3/14 |
| 59-16703 | 1/1984 | Japan | B27K 3/52 |
| 62-152505 | 7/1987 | Japan | B01D 9/02 |
| 868051 | 4/1988 | South Africa | |

OTHER PUBLICATIONS

Francis, A. W., "Ternary Systems of Liquid Carbon Dioxide", J. Phys. Chem. 58:1099, Dec., 1954.
Smith, R. D., "Direct Fluid Injection Interface for Capillary Supercritical Fluid Chromatography–Mass Spectrometry" J. Chromatog. 247(1982):231–243.
Krukonis, V., "Supercritical Fluid Nucleation of Difficult-to-Comminute Solids", paper presented at 1984 Annual Meeting, AIChE, San Francisco, California, Nov. 25–30, 1984.
Dandage, D. K., et al., "Structure Solubility Correlations: Organic Compounds and Dense Carbon Dioxide Binary Systems", Ind. Eng. Chem. Prod. Res. Dev. 24: 162–166 (1985).
Matson, D. W., et al., "Production of Powders and Films by the Rapid Expansion of Supercritical Solutions", J. Materials Science 22: 1919–1928 (1987).
McHugh, M. A., et al., "Supercritical Fluid Extraction, Principles and Practice", Butterworth Publishers (1986) Contents and Append.
Cobbs, W. et al., "High Solids Coatings Above 80% By Volume", Water-Borne & High Solids Coatings Symposium, Mar. 1980.
Matson, D. W. et al., "Production of Fine Powders by the Rapid Expansion of Supercritical Fluid Solutions", Advances in Ceramics vol. 21, pp. 109–121 (1987).
Kitamura, Y., et al., "Critical Superheat for Flashing of Superheated Liquid Jets", Ind. Eng. Chem. Fund. 25:206–211 (1986).
Petersen, R. C. et al., "The Formation of Polymer Fibers From the Rapid Expansion of SCF Solutions" Pol. Eng. & Sci. (1987) V. 27 p. 16.

*Primary Examiner*—Maurice J. Welsh
*Attorney, Agent, or Firm*—G. L. Coon

[57] ABSTRACT

A process for inhibiting chemical reactions of a fluid functionally reactive organic material by mixing it with supercritical fluid ("SCF") or near supercritical fluid, especially carbon dioxide maintained under supercritical fluid conditions. The process includes the ability to restrain a chemical reaction that occurs otherwise between functionally compatible organic molecules by the inclusion of supercritical fluid, particularly $CO_2$, with the molecules, so that the reaction can be made to occur according to a predetermined but different from normal pattern.

13 Claims, 3 Drawing Sheets

CHEMICAL REACTION SUPPRESSION SYSTEM

This application is a continuation of prior U.S. application Ser. No. 07/676,074 filed Mar. 27, 1991.

BRIEF DESCRIPTION OF THE INVENTION

This invention relates to inhibiting chemical reactions of a fluid functionally reactive organic material by mixing it with supercritical fluid ("SCF") carbon dioxide maintained under supercritical fluid or near supercritical conditions. The invention includes the ability to restrain a chemical reaction that occurs otherwise between functionally compatible organic molecules by the inclusion of supercritical fluid $CO_2$ with the molecules, so that the reaction can be made to occur according to a predetermined but different from normal pattern.

BACKGROUND TO THE INVENTION

There are an abundance of organic chemical reactions between functionally reactive organic compounds to make condensation or addition products in which it would be desired to suppress the rate of reaction, even blocking the occurrance of the reaction, until select conditions are achieved. When that occurs, it would be desirable to unsuppress or unblock the reaction and produce, in the typical manner, the desired or expected reaction product. Included in these organic chemical reactions are the coreaction of amino groups with other functional groups via condensation or addition (e.g., Michaels addition).

Oftentimes, the amino containing reactant contains another functional group that has the potential of reacting with either the amino functionality and/or the functional group of a co-reactant. In those cases, one may desire to block the reaction of the amino group in favor of the other group on that organic compound.

There are many polymeric reaction systems, typically of the thermosettable resin type, that depend on the blending of organic monomers, oligomers or polymers that possess interreactive (typically complementary) functionality. In most cases, it would be desirable to suppress or block the reaction of such systems in order to avoid premature reactions that result in wastage of the resin components by having a reaction occur before the reaction system has been shaped or applied for production of the ultimate end product. This is often called extending the pot-life of the reaction system. There are applications where some level of reaction is developed followed by suppression of the reaction to prevent full cure. For example, there are situations where a thermosettable resin is applied to a fibrous mass of strands, bundles or staple forms of fiber to make a fiber reinforced plastic ("FRP") and it would be desirable to allow such systems to partially cure to the B-stage only. In those cases, it would be desirable to arrest full cure until the system is ready to be applied to a substrate, mold, etc., and then be subjected to final cure, called the C-stage. Oftentimes, those applications would cure to premature unshapable conditions and the applications have to be discarded as waste. This can occur with SMC (i.e., sheet molding compounds) and prepregs.

There are resin systems from multicomponents that are mixed immediately prior to use. One such system is called reaction injection molding ("RIM"). In RIM systems, complementary reactive components are premixed immediately prior to being injected into the mold. Premature reaction is avoided by completing the mixing and injection into the mold before the resin components interreact to a condition that renders the system incapable of being effectively injected into the mold. Because RIM is a relatively high speed process, the complementary reactive components possess a very short pot-life. The mixing step entails the use of continuous mixers just before entry into the mold and the reactants are separately fed to the mixer to avoid premature reaction. It would be desirable to be able to premix these reactants without premature reaction in other type of mixing means, even store the mixture, and then have the ability to inject the reactants into a mold. It would be desirable to be able to suppress the reaction until the reactants have adequately filled the mold.

There are many polymeric systems used to effect coating or adhesive application to a substrate where it is desirable to operate at the minimum viscosity. For example, coatings have better flow control at lower viscosities. Adhesives better penetrate a substrate such as wood when applied at lower viscosities. However, controlling their viscosities is dependent upon the ability to suppress interreactions between the resin forming components. It would thus be desirable to be able to suppress or block such reactions until the application has been effected.

This invention provides the ability to selectively suppress such chemical reaction by incorporating a supercritical fluid, especially carbon dioxide maintained under supercritical fluid (SCF) conditions into the chemical reaction system. The advantage of reaction suppression is one of a number of advantages provided by this invention.

Because of environmental concern in recent years, there is an interest in finding ways of reducing pollution resulting from painting and finishing operations. For this reason there has been a great deal of emphasis placed on the development of new coating technologies which diminish the emission of organic solvent vapors. A number of technologies have emerged to meet most but not all of the performance and application requirements, and at the same time meet emission requirements and regulations. They are: (a) powder coatings, (b) water-borne dispersions, (c) water-borne solutions, (d) non-aqueous dispersions, and (e) high solids compositions. Each technology has been employed in certain applications and each has found a niche in a particular industry. However, at the present time, none has provided the performance and application properties that was hoped for initially.

Powder application, for example, while providing ultra-low emission of organic vapors, is characterized by poor gloss or good gloss with heavy orange peel, poor definition of image gloss with heavy orange peel, and poor film uniformity. Pigmentation incorporation is often a problem that at times requires milling and extrusion of the polymer-pigment composite mixture followed by cryogenic grinding. In addition, changing colors of the coatings line often requires a complete cleaning because of dust contamination of the application equipment and finishing area.

Water-borne coatings cannot be applied under conditions of high relative humidity without serious coating defects. These defects result from the fact that under conditions of high humidity, water evaporates more slowly than the organic co-solvents of the coalescing aid. As might be expected, in the case aqueous dispersions, the loss of the organic cosolvent/coalescing aid interferes with film formation resulting in poor gloss, poor uniformity and pin holes. Additionally, waterborne coatings are not as resistant to corrosive environments as are the more conventional solvent-borne coatings.

Coatings applied from organic solvents at high solids avoid many of the pitfalls of powder and water-borne coatings. In these systems, the molecular weight of the polymer is low and reactive functionality is relied upon to further polymerization and crosslinking after the coating has been applied. In reality, there is a limit in the ability of this technology to meet the performance requirements of a commercial coating operation. Present high solids systems are difficult to apply to vertical surfaces without running and sagging of the coating. Often they are prone to cratering and pin-holing. If they have good reactivity they have poor shelf and pot-life; if they have shelf stability then often they cure and/or crosslink slowly or require high temperature and energy to convert.

It would be desirable to suppress the reactivity of such coating systems possessing reactive functionality, so that they possess the desired amount of functionality so as to react quickly enough when coated onto the substrate yet not prematurely react so as to adversely affect coating quality.

The use of supercritical fluids as a transport medium for the manufacture of surface coatings is well known. German patent application 28 53 066 describes the use of a gas in the supercritical state as the fluid medium containing the solid or liquid coating substance in the dissolved form. In particular, the application addresses the coating of porous bodies with a protectant or a reactive or nonreactive decorative finish by immersion of the porous body in the supercritical fluid coupled with a pressure drop to effect the coating. The most significant porous bodies are porous catalysts. The applicant characterizes fabrics as porous bodies.

Smith, U.S. Pat. No. 4,582,731, patented Apr. 15, 1986, and U.S. Pat. No. 4,734,451, patented Mar. 29, 1988, describes forming a supercritical solution which includes a supercritical fluid solvent and a dissolved solute of a solid material and spraying the solution to produce a "molecular spray." A "molecular spray" is defined as a spray "of individual molecules (atoms) or very small clusters of the solute." The Smith patents are directed to producing free films and powders. The films are used as surface coatings.

U.S. patent application Ser. No. 133,068 and U.S. Pat. No. 4,923,720, to Lee et al., disclose a process and apparatus for the liquid spray application of coatings to a substrate and minimize the use of environmentally undesirable organic diluents. The process of the application involves:

(1) forming a liquid mixture in a closed system, said liquid mixture comprising:
  (a) at least one polymeric compound capable of forming a coating on a substrate; and
  (b) at least one supercritical fluid, in at least an amount which when added to (a) is sufficient to render the viscosity of said mixture of (a) and (b) to a point suitable for spray applications; and
(2) spraying said liquid mixture onto a substrate to form a liquid coating thereon.

They are also directed to a liquid spray process in which at least one active organic solvent (c) is admixed with (a) and (b) above prior to the liquid spray application of the resulting mixture to a substrate. The preferred supercritical fluid is supercritical carbon dioxide.

The process employs an apparatus in which the mixture of the components of the liquid spray mixture can be blended and sprayed onto an appropriate substrate. The apparatus contains (1) means for supplying at least one polymeric compound capable of forming a continuous, adherent coating;
(2) means for supplying at least one active organic solvent;
(3) means for supplying supercritical carbon dioxide fluid;
(4) means for forming a liquid mixture of components supplied from (1)–(3); and
(5) means for spraying said liquid mixture onto a substrate.

The apparatus may also provide for (6) means for heating any of said components and/or said liquid mixture of components. U.S. patent application Ser. No. 133,068 and the patent demonstrate the use of supercritical fluids, such as supercritical carbon dioxide fluid, as diluents in highly viscous organic solvent borne and/or highly viscous non-aqueous dispersions coatings compositions to dilute the compositions to application viscosity required for liquid spray techniques. They further demonstrate that the method is generally applicable to all organic solvent borne coatings systems.

Copending U.S. application Ser. No. 218,910 is directed to a liquid coatings application process and apparatus in which supercritical fluids, such as supercritical carbon dioxide fluid, are used to reduce to application consistency viscous coatings compositions to allow for their application as liquid sprays. The coatings compositions are sprayed by passing the composition under pressure through an orifice into the environment of the substrate.

In particular, the process of U.S. application Ser. No. 218,910 for liquid spray application of coatings to a substrate comprises:

(1) forming a liquid mixture in a closed system, said liquid mixture comprising:
  (a) at least one polymeric component capable of forming a coating on a substrate; and
  (b) a solvent component containing at least one supercritical fluid, in at least an amount which when added to (a) is sufficient to render the viscosity of said mixture to a point suitable for spray application; and
(2) spraying said liquid mixture onto a substrate to form a liquid coating thereon by passing the mixture under pressure through an orifice into the environment of the substrate to form a liquid spray.

U.S. application Ser. No. 218,895 is directed to a process and apparatus for coating substrates by a liquid spray in which 1) supercritical fluid, such as supercritical carbon dioxide fluid, is used as a viscosity reduction diluent for coating formulations, 2) the mixture of supercritical fluid and coating formulation is passed under pressure through an orifice into the environment of the substrate to form the liquid spray, and 3) the liquid spray is electrically charged by a high electrical voltage relative to the substrate.

In particular, the process of U.S. application Ser. No. 218,895 for electrostatic liquid spray application of coatings to a substrate comprises:

(1) forming a liquid mixture in a closed system, said liquid mixture comprising:
  (a) at least one polymeric component capable of forming a coating on a substrate; and (b) a solvent component containing at least one supercritical fluid, in at least an mount which when added to (a) is sufficient to render the viscosity of said mixture to a point suitable for spray application;

(2) spraying said liquid mixture onto a substrate to form a liquid coating thereon by passing the mixture under pressure through an orifice into the environment of the substrate to form a liquid spray; and (3) electrically charging said liquid spray by a high electrical voltage relative to the substrate and electric current.

The above technologies amply demonstrate the applicability of supercritical fluids as a carrier and viscosity reducer for transporting a variety of coating materials and effectively spraying them onto a coatable surface while reducing the amount of volatile organic compounds (VOCs) that are required for the application.

THE INVENTION

This invention relates to the inhibition of chemical reaction of a fluid functionally reactive organic material by mixing it with supercritical fluid ("SCF"), especially carbon dioxide maintained under supercritical fluid or near supercritical conditions. The invention includes the ability to restrain a chemical reaction that occurs otherwise between functionally compatible organic molecules by the inclusion of supercritical fluid, particularly $CO_2$, with the molecules, so that the reaction can be made to occur according to a predetermined but different-from-normal pattern.

The invention embraces the inhibition of reaction between one or more monomers, one or more monomers and an oligomer or polymer, one or more oligomers and a polymer, and one or more polymers, where the reaction is effected between functional groups in them that are complementary to the extent that when they react, the monomer, oligomer or polymer, as the case may be, are joined via the functionality to form a larger molecule. The inhibition is effected by incorporating supercritical fluid, especially $CO_2$, into the mixture of the monomer, oligomer or polymer, as the case may be. While the mixture is kept under pressure and heated such that the SCF (e.g., $CO_2$) is kept under supercritical fluid condition, the reaction is suppressed. When the temperature and pressure condition are lowered below the supercritical fluid conditions for the SCF ($CO_2$), the suppression effect is removed and the reaction proceeds normally. In certain reaction systems, the suppression is complete until SCF conditions are withdrawn. In other reaction systems, suppression is temporary, and reaction will eventually proceed, but only at an accelerated rate once the SCF conditions are withdrawn.

The invention offers a broad range of applications, and the use of the invention is applicable to the variety of applications referred to above. The invention is useful for controlling reactions in FRP, RIM and coating applications and offers the ability to use conventional pot mixing of the reactants prior to injection, allowing the cure to occur in the mold or on the coatable surface, when cure is desired. This is particularly desirable in molding applications where the mold is fiber-filled for product reinforcement. The invention is particularly useful for controlling the reaction of resin forming components kept in a hold tank prior to pressure injection into the mold, as described in Angell, U.S. Pat. No. 4,692,291, patented Sep. 8, 1987.

The invention is directed to suppressing the reaction between molecules containing complementary functional groups, such as those characterized in the following table:

| Functional Group A | Complementary Functional Group B |
|---|---|
| $-N{=}C{=}O$ | $HO-$ |
| $-N{=}C{=}O$ | $H_2N-$ |
| epoxide $-CH(O)CH_2$ | $H_2N-$ |
| epoxide $-CH(O)CH_2$ | $HO-$ |
| $-C(=O)-OH$ | $H_2N-$ |
| $-C(=O)-OH$ | $HO-$ |
| $-C(=O)-CR{=}CH_2$ | $H_2N-$ |
| $-C(=O)-CR{=}CH_2$ | $HO-$ |

The invention relates, in particular, to the extension of pot-life of polyurethane forming reactants, multipackaged acrylic and epoxy resin systems, by mixing them with SCF carbon dioxide. In these very valuable commercial systems, it is possible to minimize the use of two or more package systems by reaction suppression through the use of SCF carbon dioxide.

In some cases, the suppression involves chemical blocking of the reaction by adding a pseudo carbonate to one of the reactants. In other cases, the suppression of reaction is effected by dilution of the reaction system. In the latter case, the dilution does not adversely affect the ultimate reactivity of the system and leaves no residual dilutant components in the finally reacted product.

DETAILED DESCRIPTION OF THE INVENTION

Figure 1:
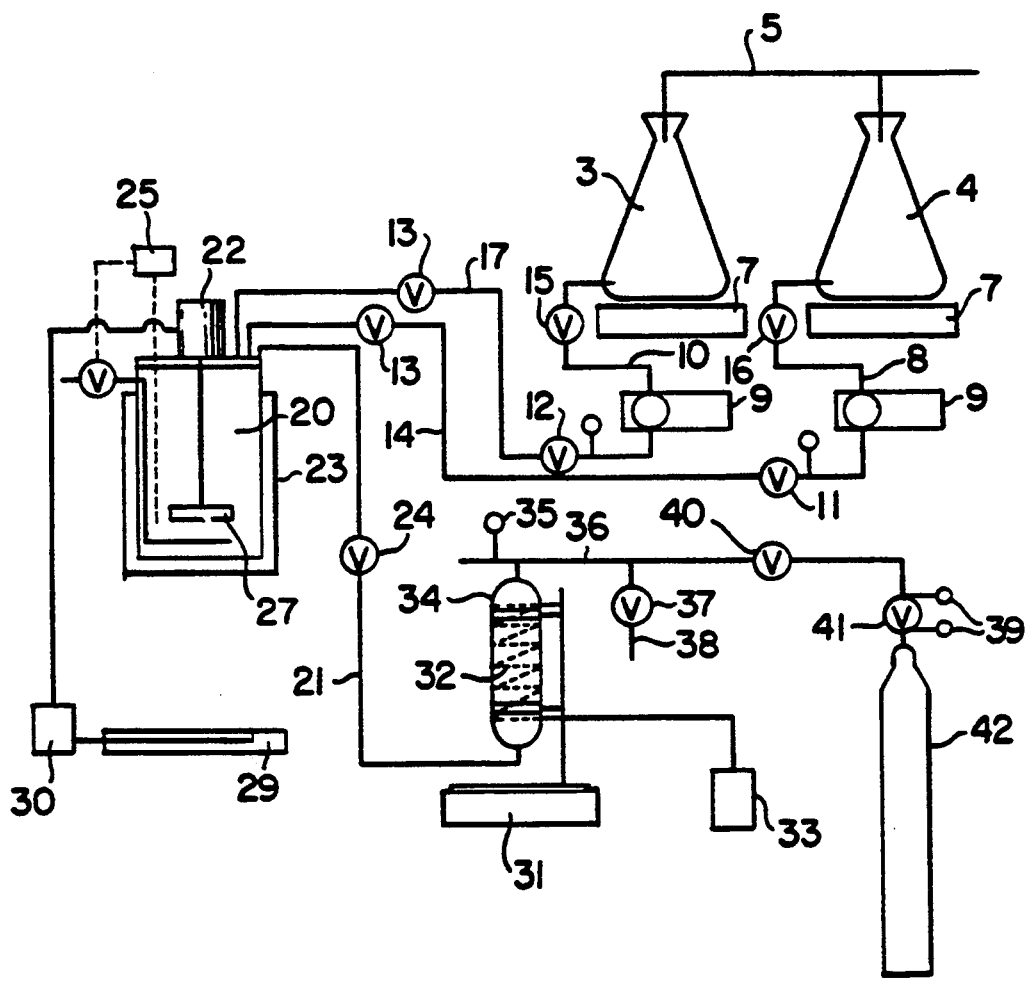
FIG. 1 schematically illustrates a laboratory experimental unit for studying two-package kinetics to observe reactions in SCF—$CO_2$ conditions.

At the outset, it should be recognized that reference to supercritical fluids as solvents for the functional compositions concerned with in the practice of this invention, will connote dissolving the composition by the supercritical fluid. The invention is not limited to dissolving the one or more interreactive compositions by the supercritical fluid; the invention encompasses as well, the dispersion and suspension of the compositions by the supercritical fluid or the dissolution of the supercritical fluid in the functional compositions. Therefore, where there is the tendency herein to lump solvency as the sole function of the supercritical fluid, it is to be understood that solvency is intended to mean that the composition is rendered into a more dilute flowable condition by virtue of the supercritical fluid, and therefore, solvency means dissolving, suspending or dispersing of the functional compositions by the supercritical fluid or the supercritical fluid into the functional compositions, so that the combined fluidity is characterizable by a lower viscosity and a more fluid composition in which reaction is suppressed.

The supercritical fluid phenomenon is well documented, see pages F-62–F-64 of the CRC Handbook of Chemistry and Physics, 67$^{th}$ Edition, 1986–1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase "supercritical fluid" denotes a compound above, at, or slightly below the critical temperature and pressure of that compound.

Examples of compounds which are known to have utility as supercritical fluids are given in Table B.

TABLE B

| EXAMPLES OF SUPERCRITICAL SOLVENTS | | | | |
|---|---|---|---|---|
| Compound | Boiling Point (°C.) | Critical Temperature (°C.) | Critical Pressure (atm) | Critical Density (g/cm$^3$) |
| CO$_2$ | −78.5 | 31.3 | 72.9 | 0.448 |

TABLE B-continued

| EXAMPLES OF SUPERCRITICAL SOLVENTS | | | | |
|---|---|---|---|---|
| Compound | Boiling Point (°C.) | Critical Temperature (°C.) | Critical Pressure (atm) | Critical Density (g/cm$^3$) |
| NH$_3$ | −33.35 | 132.4 | 112.5 | 0.235 |
| H$_2$O | 100.00 | 374.15 | 218.3 | 0.315 |
| N$_2$O | −88.56 | 36.5 | 71.7 | 0.45 |
| Xenon | −108.2 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

Many other supercritical compounds are cited in the aforementioned CRC Handbook of Chemistry and Physics, supra.

Due to the low cost, low toxicity and low critical temperature of carbon dioxide, and because of its capability of adducting or complexing with a number of functional groups, such as amines, ammonium, and the like, supercritical carbon dioxide fluid is preferably used in the practice of the present invention. For many of the same reasons, nitrous oxide (N$_2$O) is a desirable supercritical fluid in the practice of the present invention. However, use of any of the aforementioned supercritical fluids and mixtures thereof are to be considered within the scope of the present invention.

The solvency of supercritical carbon dioxide is similar to that of a lower aliphatic hydrocarbon and, as a result, one can consider supercritical carbon dioxide as a replacement for a hydrocarbon solvent.[1] In addition to the environmental benefit of replacing hydrocarbon solvents with supercritical carbon dioxide, there is a safety benefit also, because carbon dioxide is nonflammable and nontoxic.

[1] However, this statement of an alleged equivalency cannot be extended across the board. As pointed out by McHugh et al., *Supercritical Fluid Extraction.*, Butterworths (Publishers), Boston, Mass, (1986) at pages 156–7, a fluid fluoroalkyl ether polymer exhibits better solubility in supercritical carbon dioxide than in hexane.

The invention is applicable to a wide variety of reaction systems, ranging from monomer to polymers, as indicated. The invention is of particular usefulness in the control of reaction of highly reactive resin systems, such as urethane, epoxy and reactive acrylics.

The urethane systems of interest comprise the reaction of a polyisocyanate, a polyol, alone or with another active hydrogen compound, typically in the presence of a catalyst, such as an amine catalyst. The polyisocyanate is an organic polyisocyanate, i.e., an organic compounds that contain at least two isocyanato groups and include the hydrocarbon diisocyanates (e.g., the alkylene diisocyanates and the arylene diisocyanates), as well as known triisocyanates and polymethylene poly(phenylene isocyanates). Illustrative polyisocyanates are:

| | |
|---|---|
| 2,4'-diisocyanatotoluene | 2,6-diisocyanatotoluene |
| methylene bis(4-cyclohexyl isocyanate) | 1,2-diisocyanatoethane |
| 1,3-diisocyanatopropane | 1,2-diisocyanatopropane |
| 1,4-diisocyanatobutane | 1,5-diisocyanatopentane |

| -continued | |
|---|---|
| 1,6-diisocyanatohexane | bis(3-isocyanatopropyl)ether |
| bis(3-isocyanatopropyl) sulfide | 1,7-diisocyanatoheptane |
| 1,5-diisocyanato-2,2-dimethylpentane | 1,6-diisocyanato-3-methoxyhexane |
| 1,8-diisocyanatooctane | 1,5-diisocyanato-2,2,4-trimethypentane |
| 1,9-diisocyanatononane | 1,10-disocyanatopropyl)ether of 1,4-butylene glycol |
| 1,11-diisocyanatoundecane | 1,12-diisocyanatododecane bis(isocyanatohexyl) sulfide |
| 1,4-diisocyanatobenzene | 2,4-diisocyanatotolylene |
| 2,6-diisocyanatotolylene | 1,3-diisocyanato-o-xylene |
| 1,3-diisocyanato-m-xylene | 1,3-diisocyanato-p-xylene |
| 2,4-diisocyanato-1-chlorobenzene | 2,4-diisocyanato-1-nitrobenzene |
| 2,5-diisocyanato-1-nitrobenzene | 4,4-diphenylmethylene diisocyanate |
| 3,3-diphenyl-methylene diisocyanate | polymethylene poly (phenyleneisocyanates) |
| isophorone diisocyanate | and mixtures thereof. |

The preferred polyisocyanates are mixture of 80% 2,4-tolylene diisocyanate and 20% 2,6-tolylene diisocyanate and polymeric isocyanate.

The polyols used in forming the polyurethane may be an organic diol, triol, tetraol, pentaol, and the like. Illustrative are the following compounds: ethylene glycol, diethylene glycol, triethylene glycol, tetraethylene glycol, 1,2-propylene glycol, di-1,2-propylene glycol, tri-1,2-propylene glycol, tetra-1,2-propylene glycol, 1,4-butanediol, 1,3-propanediol, and the like; or formed from by the alkoxylation of a starter polyol, such as the class of polyols characterized; or formed from reaction of the above diols, triols, etc., with caprolactone. The resulting ester polyols ("Tone's") are widely used in reactions with isocyanate. Desirable alkoxylated polyols are alkylene oxide adducts of a hydroxylated alcohols of the formula:

$$A(OH)_{>1}$$

and preferably a "starter" diol, triol, tetraol and higher hydroxylated alcohols, of the formula:

$$A(OH)_{\geq 2-6}$$

wherein A is a polyvalent organic moiety, the free valence of which is 2–6 or greater, or an average value equal thereto, as the case may be.

Illustrative of suitable compounds embraced by the "starter" $A(OH)_{2-6}$ alcohol are the following: ethylene glycol, diethylene glycol, 1,2-propylene glycol, glycerine, pentaerythritol, sorbitol, diether of sorbitol, mannitol, diether of mannitol, arabitol, diether or arabitol, sucrose, mixtures thereof, and the like.

The starter $A(OH)_{>2-6}$ is first reacted with 1,2-alkylene oxide in an amount and under conditions sufficient to convert its hydroxyl groups to hydroxyalkyl groups. The amount of 1,2-alkylene oxide reacted is sufficient to achieve the ultimate molecular weight of the alkoxylated polyol adduct. The molecular weight of the alkoxylated polyol adduct should be relatively high, preferably above about 4000 (number average) and, more preferably, above about 5000. The minimum molecular weight of the alkoxylated polyol adduct may be about 3000. The preferred 1,2-alkylene oxides are lower 1,2-alkylene oxides, such as ethylene oxide, 1,2-propylene oxide, 1,2-butylene oxide, and the like. In the preferred practice of the invention, the starter alcohol is reacted with 1,2-propylene oxide in an amount sufficiently to create the desired polyol molecular weight. Then, the resulting polyol may be hydroxyethyl capped by reaction with 1,2-ethylene oxide to provide assurance of primary hydroxyl content in the polyol especially if the alkoxylated polyol adduct is subsequently coupled, not polymerized, with an organic polyisocyanate. Such alkoxylation reactions, with consequent adduct formation, is well known in the art, and forms no part of this invention. Adduct reactions may be base or acid catalyzed, with base catalyzation preferred.

The organic polyol may be a polyester polyol, such as a polyester of a dicarboxylic acid, acid halide or anhydride and a polyol, such as those characterized above. In this case, it is desirable to allow the polymer to be hydroxyl terminated, and conventional procedures in the art are useful for this purpose. A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane.

Polyester resins are typically reaction products of a dicarboxylic acid, acid halide or anhydride, with a polyhydric alcohol. The dicarboxylic acids or anhydrides that are employed to produce the polyester, either singly or in combination, include those that contain olefinic unsaturation, preferably wherein the olefinic unsaturation is alpha, beta- to at least one of the carboxylic acid groups, saturated aliphatic, heteroaliphatic and aromatic polycarboxylic adds, and the like. Such acids include maleic add or anhydride, fumaric acid, methyl maleic acid, and itaconic acid (maleic acid or anhydride and fumaric acid are the most widely used commercially), saturated and/or aromatic dicarboxylic acids or anhydrides such as phthalic acid or anhydride, terephthalic acid, hexahydrophthalic acid or anhydride, adipic acid, isophthalic acid, and "dimer" add (i.e., dimerized fatty acids).

Epoxy resins are frequently based, inter alia, on one or more of diglycidyl ethers of bisphenol A (2,2-bis(4-hydroxyphenyl)propane) or sym-tris(4-hydroxyphenyl)propane, tris(4-hydroxyphenyl)methane, their polyepoxide condensation products, cycloaliphatic epoxides, epoxy-modified novolacs (phenol-formaldehyde resins) and the epoxides derived from the reaction of epichlorohydrin with analine, o-, m- or p-aminophenol, and methylene dianaline. Illustrative resins are epoxies curing at 350° F. (177° C.) and 250° F. (121° C.). Other reactive resin systems benefitted by the invention include the various thermosetting or thermosettable resins include the bismaleimide (BMI), phenolic, polyester (especially the unsaturated polyester resins typically used in SMC production), PMR-15 polyimide and acetylene terminated resins have been found suitable.

The epoxy resins suitable in the practice of the invention include the various established thermosetting epoxy resins conventionally employed in making prepregs, especially carbon and graphite fiber reinforced prepregs. It is desirable that the epoxy resin be a low or lower viscosity version to facilitate prepreg formation. Illustrations of suitable epoxy resins include, e.g., one or more of diglycidyl ethers of bisphenol A (2,2-bis(4-hydroxyphenyl)propane) or sym-tris(4-hydroxyphenyl)propane or tris(4-hydroxyphenyl)methane, their polyepoxide condensation products, cycloaliphatic epoxides, epoxy-modified novolacs (phenol-formaldehyde resins) of the formula:

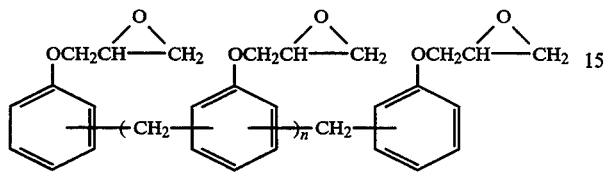

wherein n is 0.2–1.8, preferably 0.2, and the epoxides derived from the reaction of epichlorohydrin with analine, o-, m- or p-aminophenol, and methylene dianaline. Particularly illustrative of suitable epoxy resins are the low viscosity epoxy resins such as bis(N,N-diglycidyl-4-aminophenyl)methane, bis-2,2-(4-glycidyloxyphenyl)-propane and condensation products thereof, sym-tris(4-glycidyloxyphenyl)propane, and 4-glycidyloxy-N,N-diglycidyl-phenylamine, and the like. Other epoxy resins may be combined with the above epoxy resins or used alone. They include, e.g., 3,4-epoxycyclohexyl-methyl-3,4-epoxycyclohexane carboxylate, vinyl cyclohexene dioxide, 2-(3,4-epoxycyclohexyl-5,5-spiro-3,4-epoxy)cyclohexane-meta-dioxane, bis(3,4-epoxycyclohexyl)adipate, and the like.

The epoxy resins of the invention are combined with hardeners which cure the resin to a thermoset condition. The preferred hardeners are amine compounds, ranging from dicyandiamide to the more desirable aromatic amines. Non-aromatic amines are better catalyst. A particularly preferred class of hardeners are the aromatic amines encompassed by the formula:

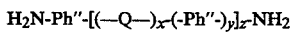

wherein Ph″ is ortho, meta or para phenylene, Q is one or more of a divalent group such as —$SO_2$—, —O—, —RR′C—, —NH—, —CO—, —CONH—, —OCONH—, and the like, R and R′ may each independently be one or more of hydrogen, phenyl, alkyl of 1 to about 4 carbon atoms, alkenyl of 2 to about 4 carbon atoms, fluorine, cycloalkyl of 3 to about 8 carbon atoms, and the like, x may be 0 or 1, y may be 0 or 1 and is 1 when x is 1, and z may be 0 or a positive integer, typically not greater than about 5.

Particularly preferred hardeners are diamines of the formula:

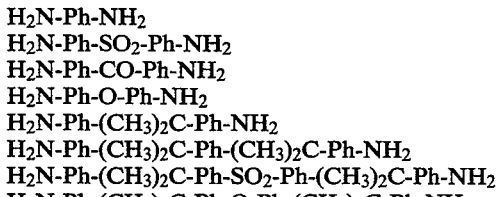

wherein Ph is as defined above. Each of the above Ph may be instead ortho or meta phenylene.

Another class of hardener are the aliphatic amines such as the alkyleneamine. Illustrative of suitable alkyleneamines are the following:
monoethanolamine
ethylenediamine
N-(2-aminoethyl)ethanolamine
Diethylenetriamine
N-(2-aminoethyl)piperazine
Triethylenetetramine
Tetraethylenepentamine
Pentaethylenehexamine
Diaminoethylpiperazine
Piperazinoethylethylenediamine
4-Aminoethyltriethylenetetramine
Tetraethylenepentamine
Aminoethylpiperazinoethylethylenediamine
Piperazinoethyldiethylenetriamine The hardener may be a monoamine such as aniline, paraaminophenol, and alkylated versions of them.

The mount of the hardener employed is usually stoichiometrically equivalent on the basis of one amine group per epoxy group in the resin. If the epoxide is a triepoxide and the hardener is a diamine, then the molar ratio of hardener to epoxide would typically be about 2.5/3 or 0.83. A typical formulation would have a weight ratio of epoxy resin to hardener of about 3/2 to about 4/1.

A significant extension of reaction pot-life was observed when the reactions of polyurethane and two-package of acrylic resin and polyepoxide were reacted in SCF—$CO_2$ with and without catalyst. The results suggest that the SCF—$CO_2$ pseudo-blocks and/or reacts the functional groups of amine. The pot-life was further extended with higher concentration of SCF—$CO_2$ in the reaction. This discovery can be used not only to reduce VOC level but also extended reaction pot-life in applications of two-package coatings process/formulation when the reactions were carried out with SCF/$CO_2$, as a reaction solvent, or in SMC and RIM molding applications. When SCF—$CO_2$ released during spray or released from the mold, the reactions of polyurethane and epoxide start.

Use of supercritical fluid $CO_2$ (SCF—$CO_2$) in polyurethane and epoxy systems appears to pseudo-block the active functional groups of —NCO and/or —OH and/or epoxy group and/or catalyst to suppress the urethane and epoxy reactions. Where the reaction conditions change to under SCF conditions (lower pressure and temperature), the reaction accelerates instantaneously (less than 1–2 minutes). This discovery can be used to the applications for the two-package coatings and molding process/formulations, and to manipulate urethane and epoxy chemistry, for example in urethane foam areas, urethane RIM moldings, urethane rubber molding, epoxy coatings, epoxy cast molding, epoxy RIM moldings, and the like.

Urethane coatings have been categorized into the following types:
Urethane alkyds (oil-modified urethane)
One-package moisture-cure urethane coatings
Single-package blocked adduct urethane coatings
Two-package catalyst urethane coatings
Two-package polyol urethane coatings
Urethane Latices.

In addition, a significant extension of reaction pot-life was observed when a two-package of carboxyl/tertiary amine functional acrylic resin and polyepoxide was reacted in SCF—$CO_2$. The pot-life was further extended with higher concentration of SCF—CO$_2$ in the reaction. This discovery can be used not only to reduced VOC level but also extended reaction pot-life in applications of two-package coatings process/formulation of carboxyl/tertiary amine functional acrylic resin and polyepoxide when the reactions were carried out with SCF—CO$_2$, as a reaction solvent.

It is known that the incorporation of reactive functional groups, such as hydroxyl, carboxyl, isocyanato, and the like, into acrylic polymer structures contribute to improved performance in a cured polymer. To form films that have acceptable physical properties from relatively low molecular weight acrylic polymers, the polymers generally have a hydroxyl content that is about two to three times higher than acrylic polymers used for conventional thermosetting compositions. The higher hydroxyl content provides additional crosslinking sites and films are formed that have excellent physical properties that are equivalent to and often better than films from conventional thermosetting acrylic compositions. The properties of the coating can also be improved by increasing the molecular weight of the polymer. This invention provides a mechanism for controlling the reaction of these functional groups with the crosslinking compositions, thereby increasing the utility of these type of acrylic resins.

Though the invention is finds particular utility with repect to functional acrylic polymers, the invention is not so limited. Any of the class of ethylenically unsaturated polymerizable monomers can be reacted to provide the kind of functional polymers contemplated. Most of such functional polymers are copolymers, generally relying on at least one acrylic monomer. In such case, the primary monomers can be copolymerized with a variety of other ethylenically unsaturated monomers to yield addition polymers suitably capable of entering into the crosslinking reaction. Typical primary ethylenically unsaturated monomers that can be used are: methyl methacrylate, ethyl acrylate, butyl methacrylate, butyl acrylate, 2-ethylhexyl acrylate, 2-ethylhexyl methacrylate, lauryl methacrylate, isodecyl acrylate, isobornyl acrylate, hexyl methacrylate, stearyl acrylate, styrene, acrylonitrile, methacrylonitrile, acrylamide, N-alkyl and N,N-dialkyl substituted acrylamides and methacrylamides such as N-methylacrylamide, N,N-dimethylacrylamide, N-methylmethacrylamide, N,N-dimethyl methacrylamide, and the like, N-vinylpyrrolidone; and the alkyl substituted N-vinyl pyrrolidones, e.g., methyl substituted N-vinylpyrrolidone, the allyl amines, vinyl chloride, vinyl acetate, vinyl propionate, vinyl 2-ethylhexanoate, vinyl neononanoate, and the like. The acrylics (inclusive of the methacrylics) are the preferred primary monomers.

Functional monomers can also be copolymerized with the above ethylenically unsaturated monomers to prepare addition polymers for use in thermoset coatings. Illustrative monomers include monoesters of acrylic acid or methacrylic acid sad sa alcohol having at least one additional hydroxyl group such as the mono- and polyalkylene glycols. Illustrative of these are ethylene glycol monomethacrylate, ethylene glycol monoacrylate, diethylene glycol monomethacrylate, diethylene glycol monoacrylate, propylene glycol monomethacrylate, propylene glycol monoacrylate, dipropylene glycol monoacrylate, and the like. Other functional monomers that can be used include acrylic acid, methacrylic acid, 3-methacryloxypropyltrimethoxysilane, N-(isobutoxymethyl)-acrylamide, glycidyl methacrylate and acrylate, and the like.

The polymers of the invention may include a minor proportion of di- or polyfunctional species such as: divinylbenzene, ethylene glycol diacrylate or dimethacrylate, propylene glycol diacrylate or dimethacrylate, and the acrylate or methacrylate esters of the following polyols: diethanolamine, triethanolamine, glycerol, pentaerythritol, butylene glycol, diethylene glycol, triethylene glycol, tetraethylene glycol, mannitol, sorbitol, and the like. Other crosslinking monomers can be employed, such as N,N-methylene-bis-acrylamide or methacrylamide, sulfonated divinylbenzene, and divinylsulfone.

Polymerization of the monomer or prepolymer material can also be effected using, for example, radiation (U.V., X-ray, microwave, or other well-known forms of radiation) with/without the presence of well-known initiator(s) and/or catalyst(s).

When using radiation as the catalyst in the polymerization process, the monomer compositions may be mixed with the gas precursor to the supercritical or near-supercritical fluid and the mixture fed under suitable supercritical or near-supercritical fluid conditions into a polymerization column (tube), typically fabricated from a material that will not impede the transmission of the radiation into the polymerization zone of the column. Glass, such as Pyrex, would be a suitable material for the polymerization column when using long wave U.V. radiation as the catalyst. When using other types of catalysts as recited above, the polymerization column could be fabricated from various types of metals such as steel, nickel, bronze, various alloys, and the like. Polymerization can be in situ generated to provide the polymers and compositions of the invention.

The crosslinkers are compositions containing complementary functional groups, such as isocyanato, carboxyl, hydroxyl, amino, ethylenic unsaturation, and the like. The crosslinker is any composition containing such groups and may be a monomer, oligomer or polymer.

FIG. 1, describes a laboratory experimental unit suitable for studying two-package kinetics to observe reactions in SCF—CO$_2$ conditions. The unit comprises feed pumps for isocyanate, the catalyst, and the liquid CO$_2$, and one-liter high pressure reactor with temperature and RPM controllers. Since the ratio of —NCO/—OH determines the size of polymer molecule, the —NCO levels should be controlled precisely. Therefore, a Gilson piston pump was used for the isocyanate feed. The specific items listed in FIG. 1 are as follows:

| ITEM | DESCRIPTION |
|---|---|
| 3 | 500 ml Flask, Erlenmeyer, Stopcock |
| 4 | 500 ml Flask, Erlenmeyer, Stopcock |
| 5 | Nitrogen purge system to block air contamination |
| 7 | New Mettler PE3000 Balance weight in range (0–3000 grams) |
| 8 | Catalyst feed line, ⅛" Teflon tube |
| 9 | Gilson Model 302 piston pump |
| 10 | Isocyanate feed line, ⅛" Teflon tube |
| 11 | 5 psi in-line check valve |
| 12 | 5 psi in-line check valve |
| 13 | ¼" niddle valve |
| 14 | Catalyst feed line, ⅛" stainless steel tube |
| 15 | ¼" Teflon stopcock for catalyst |
| 16 | ¼" Teflon stopcock for catalyst |
| 17 | Isocyanate feed line, ⅛" Teflon tube |
| 20/27 | Model 4521M, PARR pressure reaction apparatus (20), 1000 ml, T316 stainless steel with variable speed motor (22), Heter and cooling 4842 PID temperature |

-continued

| ITEM | DESCRIPTION |
|------|-------------|
|  | controller (25), 115V, with Tachometer and agitator (27), and heating mantle (23). |
| 21 | ⅛ in. stainless steel tube for Carbon dioxide feed line |
| 24 | ⅛ in. stainless steel needle valve. |
| 29 | Flatbed recorder, #L-08376-10 Single-channel 100 m/m recorder. |
| 30 | Mixers with speed/torque readout, #L-04407-00 gear-motor, max. torque 336 in-oz, speed range 2 to 250 rpm. |
| 31 | Sartorious high-capacity scales, #N-01024-74, max. capacity 31,000 grams. |
| 32 | Electric heat tape, |
| 33 | Variac, autotransformer |
| 34 | 1000 ml Hoke cylinder |
| 35 | Pressure indicator, range from 0 to 3000 psi |
| 36 | ¼" stainless steel tube for carbon dioxide transfer line |
| 37 | ¼" stainless steel needle valve |
| 38 | ¼" stainless steel tube for carbon dioxide purge |
| 39 | Carbon dioxide cylinder regulator |
| 40 | ¼" stainless steel needle valve |
| 41 | Carbon dioxide cylinder regulator |
| 42 | Carbon dioxide cylinder with dip-tube |

Figure 2:
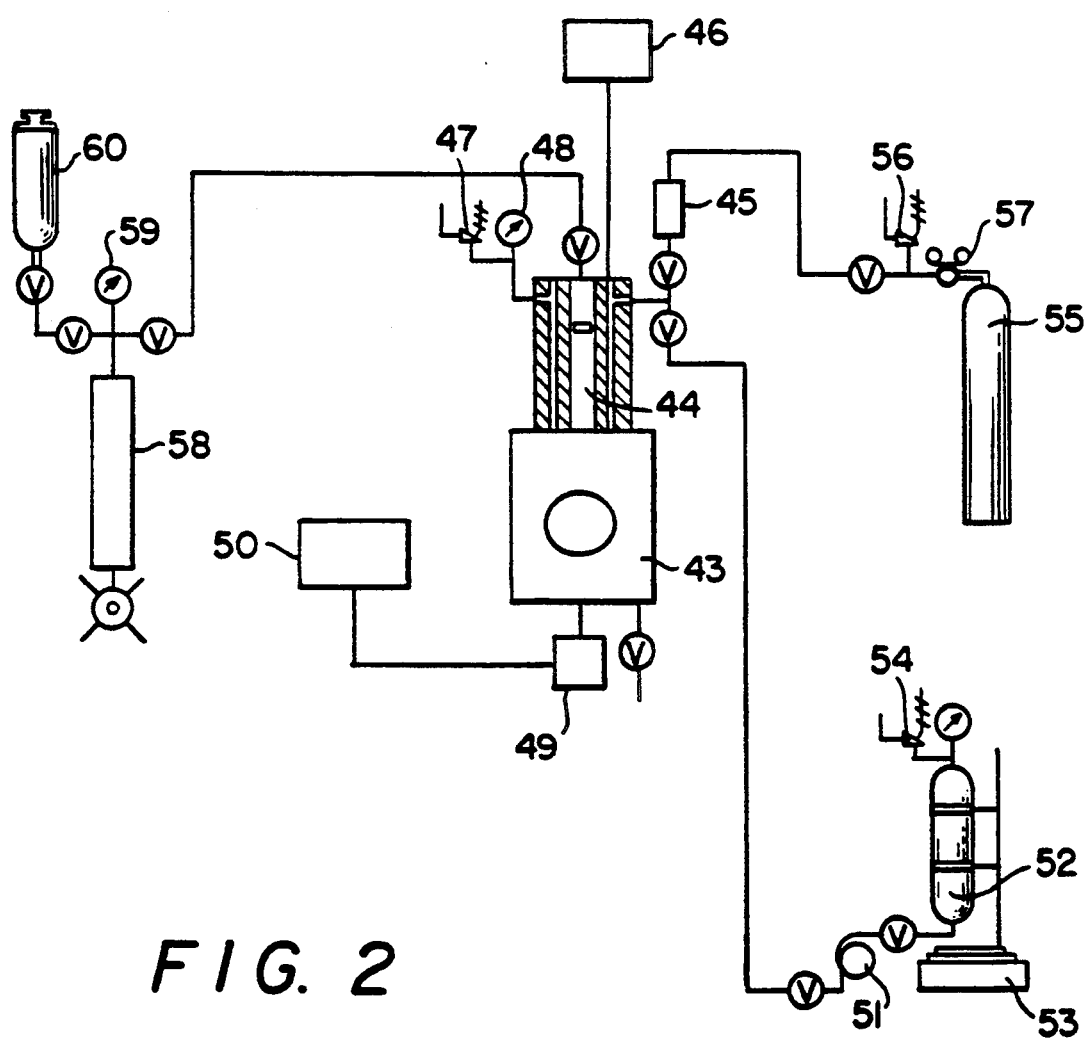
FIG. 2 schematically illustrates a reactor assembly that allows measurement of polymerization reaction by viscosity change.

FIG. 2 comprises a polymerization reactor in which polymerization can be monitored by the observation through the windows and/or viscosity changes. It comprises 1½" threaded sight flow indicator that was designed for reaction study. The system includes a thermocouple, top and bottom feeds, agitator and two sealed glass windows. Also two piston type accumulators were connected to the reactor. The one mounted on the top of the reactor cell was used to maintain constant reaction pressure by varying reactor volume. The other is used as pre-polymer feeding pot. A magnetic stirrer is installed on the reactor. The whole reaction system is traced by heating medium to maintain constant reaction temperature. This minimizes hot spots in the system. The degree of polymerizations is determined by measuring the torque of the stirrer. The level of torque is recorded to provide continuous measurements. The specific items listed in FIG. 2 are as follows:

| ITEM | DESCRIPTION |
|------|-------------|
| 43 | Model #S100, 1.5" Threaded Stainless steel sight flow indicator, max. 3000 psi. |
| 44 | Approx. 200 ml stainless steel threaded accumulator with floating a piston, two 3/16" pots for carbon dioxide feed and reactants, and a thermocouple connection. |
| 45 | 100 ml piston type stainless steel accumulator. |
| 46 | Model DSS-650 Digital Thermometer type J. |
| 47 | Relief valve, set 1600 psi |
| 48 | Pressure indicator, range 0 to 3000 psi |
| 49 | Model A1120HC, PARR magnetic stirrer assembly with 1/16 HP motor |
| 50 | Mixers with speed/torque readout, #L-04406-10 direct-drive, max. torque 1600 g-cm, speed range 20 to 2500 rpm. |
| 51 | Haskel liquid carbon dioxide pump Model #29723-21 |
| 52 | 2000 ml Hook cylinder for carbon dioxide feed tank |
| 53 | Sartorious high-capacity scales, #N-01024-74, max. capacity 31,000 grams. |
| 54 | Pressure relief valve, set 1600 psi |
| 55 | Nitrogen cylinder |
| 56 | Pressure relief valve, set 2300 psi |
| 57 | Nitrogen pressure regulator |
| 58 | Pressure generator |
| 59 | Pressure indicator range from 0 to 3000 psi |
| 60 | Approx. 100 ml of Hydrauric fluid storage tank |

The measurement of polymerization rates are difficult to do, such as the direct measurement of reaction rates of —NCO and —OH. Off-line sample measurement for the unreacted —NCO concentration, or for solution viscosity, has been used to determine the reaction rates when the reaction of —NCO and —OH is slow enough. Since the reactions of —NCO and —OH are 100–1000 times faster in the presence of a catalyst, it is necessary to use on-line measurement devices in those cases, such as a RUSKA high pressure falling ball viscometer or in-process viscosity sensor. Because these devices have a viscosity limitation (less than 50,000 cp) and longer data retention time (more than minutes at high viscosity), it became necessary to develop an alternative method to monitor such reaction rates.

Viscosity of the fluid is somewhat related to the torque of the rotational force delivered by the stirrer. For the Newtonian liquids, the basic equations for viscosity ($\cap$) is:

$$\cap = \frac{\alpha \cdot G}{\pi \cdot R^3 \cdot w} \cdot M$$

where R is the radical distance of the sample, G is a constant depending upon the geometry of the stirrer, M is the torque required to rotate at the an angular frequency of w radian per second.

The above equation suggested that the solution viscosity, which is directly related to the polymerization, can be determined by measuring the level of torque at constant temperature and speed. Agitation provided by the stirrer will help to assure the uniform mixing of —OH, —NCO, catalyst, solvent, and $CO_2$. However, there is a tendency for the development of secondary flows in the polymer, and for the polymer to break up if the stirring speed is too high. Less than 100 RPM was selected as the maximum speed to achieve the mixing and torque measurement. A set of experiments was conducted to determine whether the selected speed ranges are appropriate.

Figure 3:
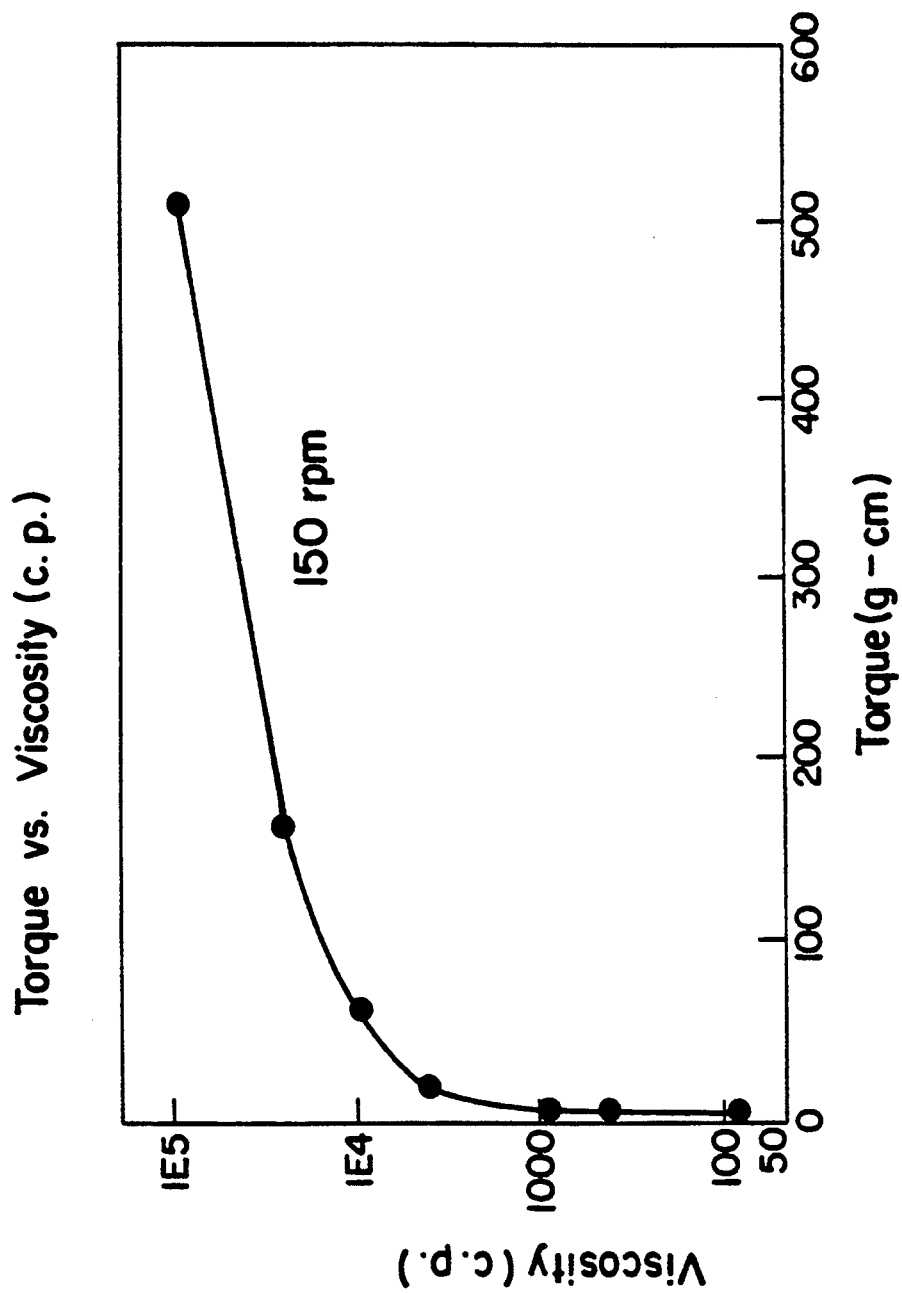
FIG. 3 is a graph illustrating correlation of viscosity and torque measurements at different RPM's at 40° C. during the course of the reaction.

The FIG. 3 shows viscosity and torque measurements at different RPM's at 40° C. Standard polymer solutions were used for the viscosity measurements. The data indicate that torque is well defined when solution viscosity exceeds 10,000 cp and speed ranges of 50–75 RPM. Also, the data indicate that torque is not sensitive when solution viscosity is less than 1000 cp and at the lower speed of 25 RPM. It was assumed that the heavy-duty ⅛ hp stirring motor had a 10:1 gear reduction-drive and a maximum torque of 336 in-oz. For the lower viscosity measurements, a 1/18-hp direct-drive motor with a maximum torque of 20 in-oz was used.

EXAMPLE 1

Non-invention System 500 grams of NIAX polyol E-518 (polyethylene oxide polyol made with 1,2,3-propane triol as the starter polyol) and 315 grams DMF (dimethylformamide) without $CO_2$ was charged into the reactor and mixed for an hour. Reaction temperature and RPM were maintained 40° C. and 50 RPM, respectively. Then 38.9 grams of MDI (4,4-diphenylmethylene diisocyanate) was fed for an hour period. With an addition of 7–8 grams of NIAX catalyst A-33 (amine/glycol mixture), the torque of the stirrer was increased from 0 to 120 in-oz less than 2 minutes.

The observation was quite surprising because the reaction of —NCO and —OH was carried out with more than 38% DMF solvent and the reaction rate was much faster than expected. The product, polyurethane, was isolated, and showed a completely cross-linked gel type polymer.

System According To The Invention

In this experiment, 500 grams of NIAX polyol E-518, 307 grams $CO_2$ and 10 grams of NIAX catalyst were charged into the reactor, and mixed for 10 hours. Reaction temperature and RPM were maintained 40° C. and 50 RPM, respectively. Then 41 grams of MDI (4,4-dimethylmethane-diisocyanate) was fed for five hours period. The calculated —NCO/—OH ratio was 0.841. The mixture was kept at the same temperature and pressure for the next 16 hours. During this period there was no observed significant torque changes. The torque valve was essentially 0 inch-ounce.

The level of torque in the reactor did not change with additional feed of 12.8 grams MDI to the reactor. Overall calculated —NCO/—OH was 1.104. However, when the system pressure was dropped to 0 psi, the torque value instantaneously reached the maximum value of 100 inch-ounce. That is, when the reaction conditions were changed to under SCF condition, the reaction accelerated instantaneously.

EXAMPLE 2

System According To The Invention

In this experiment, 120 grams of NIAX polyol E-518, 66.8 grams $CO_2$ and 2.4 grams of triethylene diamine catalyst were charged into the reactor, and mixed for 1 hour. Reaction temperature and pressure were maintained 40° C. and 1350 psia. respectively. Then 11.5 grams of MDI was fed for 55 minutes period. The calculated —NCO/—OH ratio was 0.98. The mixture was kept at the same temperature and pressure for an hour. During this period there was observed the following changes through the two sealed glass windows:

(1) With the mixture of E-518 and SCF—$CO_2$, the mixture showed one phase, light-yellowish clear solution.
(2) With the addition of MDI, the color of the mixture changed to brown.
(3) The mixture was got thick when the —NCO/—OH ratio approached 0.98 but no significant changes in torque values were observed.
(4) When the reaction pressure conditions were changed to under SCF condition, the reaction accelerated instantaneously.

Non-invention System

In this experiment, the same conditions used above were employed except that DMF (N,N-dimethylformamide) was substituted for the SCF—$CO_2$. NIAX polyol E-518 (120 grams), 74.5 grams of DMF and 2.4 grams of triethylene diamine catalyst were charged into the reactor, and mixed for 1 hour. Reaction temperature was maintained 40° C. at atmospheric pressure. Then 6.8 grams of MDI 4,4-dimethylmetane-diisocyanate) was fed for 25 minutes period. The mixture got thick and formed a completely gel when the —NCO/—OH ratio approached to 0.58. The torque increased to the maximum values of 2000+ gr-cm instantaneously.

EXAMPLE 3

Non-invention System

In this experiment, 60 grams of NIAX polyol E-518, 1.0 gram of dibutyl tin dilaurate catalyst (0.02% of tin/gram of polyol) were charged into the reactor, and mixed for 1 hour. Reaction temperature of 40° C. was maintained at atmosphere pressure. Then 6 grams of MDI was fed instantaneously. The calculated —NCO/—OH ratio was 1.05. The mixture was kept at the constant temperature. During the experiment, the following changes were observed through the two sealed glass windows:

(1) The mixture of E-518, tin catalyst, and MDI was light-yellowish clear solution.
(2) With the addition of MDI, the color of the mixture changed to brown.
(3) Then the mixture got thick and the solution was converted into a gel within 5 minutes and the torque increased to the maximum value immediately.

System According To The Invention

In this experiment, 500 grams of NIAX polyol E-518, 309 grams $CO_2$ and 0.5 grams of dibutyl tin dilaurate catalyst (0.1% of tin/gram of polyol) were charged into the reactor, and mixed for 1 hour. Reaction temperature and pressure were maintained at 40° C. and 1220 psia, respectively. Then 24.7 grams of MDI (4,4-dimethylmethane-diisocyanate) were fed for 1 hour 50 minutes period. The calculated —NCO/—OH ratio was 0.506. The mixture was kept at the same temperature and pressure for an hour. During the experiment, the following changes were observed through the two sealed glass windows:

(1) The mixture of E-518 and SCF—$CO_2$ appeared to be a single phase, light-yellowish clear solution.
(2) With the addition of MDI, the color of the mixture changed to brown.
(3) Over the one-hour residence, the mixture eventually got thick and formed a gel when the —NCO/—OH ratio reached 0.506 and the torque increased to the maximum value instantaneously.

The use of SCF carbon dioxide with a tin catalyst system slowed the reaction sufficiently that the reaction system could have been maintained in a pot and fed to a mold within the one-hour period. That was not possible in the absence of SCF carbon dioxide.

EXAMPLE 4

In this experiment, the same conditions used above were employed except using lower level of tin catalyst. NIAX polyol E-518 (400 grams), 217 grams $CO_2$ and 0.02 grams of dibutyl tin dilaurate catalyst (0.005% of tin/gram of polyol) were charged into the reactor, and mixed for 1 hour. Reaction temperature and pressure were maintained 40° C. and 1220 psia. Then 31.7 grams of MDI was fed over a 2 hour 5 minutes period. The calculated —NCO/—OH ratio was 0.815. The mixture was kept at the same temperature and pressure. During the experiment, the following changes were observed through the two sealed glass windows:

(1) With the mixture of E-518 and SCF—$CO_2$, the mixture was a one-phase, light-yellowish clear solution.
(2) On addition of MDI, the color of the mixture changed to brown.
(3) The mixture gradually thickened.
(4) When the solution —NCO/—OH ratio was 0.815, a completely a gel was formed.
(5) At this point, the torque increased to the maximum value instantaneously.

EXAMPLE 8-10

In these experiments, designed amounts of pre-polymer A, pre-polymer B and organic solvent or carbon dioxide were charged and mixed in the reactor cell as set forth in the following table. Pre-polymer A was Acryloid AT-954 acrylic resin, sold by Rohm & Haas, and pre-polymer B was Desmodure N-3390 polymeric isocyanate, sold by Mobay Inc. Pressure and temperature were kept constant at the given conditions during the studies. The torque of the stirrer was measured and recorded. The reaction pot-life was determined when the torque increased to the maximum value of 2000 in-oz. "DMF" is N,N-dimethylformamide.

|  | EX. 8 | EX. 9 | EX. 10 |
|---|---|---|---|
| g. polymer-A | 140 | 140 | 140 |
| g. polymer-B | 74.9 | 74.9 | 74.9 |
| g. DMF | none | 86 | none |
| g. carbon dioxide | none | none | 86 |
| pressure, PSI | 14.7 | 14.7 | 1200 |
| temperature, °C. | 55 | 55 | 55 |
| pot-life | 50 min | 2 hours | 1 hour 32 min |

EXAMPLE 11-17

In these experiments, designed amounts of pre-polymer A, pre-polymer B and organic solvent or carbon dioxide were charged and mixed in the reactor cell as set forth in the following table. Pre-polymer A is prepared from Imron-500-S polyurethane enamel, sold by Dupont, by various solvent exchange. Pre-polymer B is Imron-192S polyurethane enamel activator, also sold by DuPont. Pressure and temperature were kept constant at the given conditions during the studies. The torque of the stirrer was measured and recorded. The reaction pot-life was determined when the torque increased to the maximum value of 2000 in-oz. "DMI" stands for the solvent N,N'-2 imidazolidinone. "PMA" is the solvent n-propymethylacetate.

|  | EX. 11 | EX. 12 | EX. 13 | EX. 14 | EX. 15 | EX. 16 | EX. 17 |
|---|---|---|---|---|---|---|---|
| 120 g. polymer-A solvent/solids | DMI/48% | DMI/48% | PMA/48% | PMA/48% | DMI/48% | DMI/48% | Toluene/23% |
| g. polymer-B | 79 | 79 | 79 | 79 | 79 | 79 | 79 |
| g. carbon dioxide | none | 120 | none | 120 | none | 120 | none |
| pressure, PSI | 14.7 | 1200 | 14.7 | 1200 | 14.7 | 1200 | 14.7 |
| temp. °C. | 55 | 55 | 55 | 55 | 55 | 55 | 55 |
| pot-life, min. | 75 | 115 | 80 | 115 | 80 | 95 | >400 |

EXAMPLE 18-21

In these experiments, designed amounts of pre-polymer A, pre-polymer B and organic solvent or carbon dioxide were charged and mixed in the reactor cell as set forth in the following table. Pre-polymer A and pre-polymer B are Universal Red Epoxy FPL-274, and Universal Epoxy Activator FPA-327, respectively, both sold by Porter Paint Co. Pressure and temperature were kept constant at the given conditions during the studies. The torque of the stirrer was measured and recorded. The reaction pot-life was determined when the torque increased to the maximum values of 2000 in-oz. "MAK" is the solvent methyl n-amyl ketone.

|  | EX. 18 | EX. 19 | EX. 20 | EX. 21 |
|---|---|---|---|---|
| g. polymer-A | 176 | 176 | 176 | 176 |
| g. polymer-B | 44 | 44 | 44 | 44 |
| organic solvent | none | MAK 44 grams | DMF 44 grams | none |
| g. carbon dioxide | none | none | none | 59 |
| pressure, PSI | 14.7 | 14.7 | 14.7 | 1200 |
| temperature °C. | 55 | 55 | 55 | 55 |
| pot-life | 25 min | >2 hrs. | >2 hrs. | >2 hrs. |

EXAMPLE 22-24

In these experiments, designed amounts of pre-polymer A, pre-polymer B and organic solvent or carbon dioxide were charged and mixed in the reactor cell as set forth in the following table. Pre-polymer A and pre-polymer B are UCAR Functional Acrylic 884, and UCARLINK 888, respectively, both sold by Union Carbide. Pressure and temperature were kept constant at the given conditions during the studies. The torque of the stirrer was measured and recorded. The reaction pot-life was determined when the torque increased to the maximum value of 2000 in-oz. "MIBK" is methyl isobutyl ketone solvent and MP is methyl propasol solvent.

|  | EX. 22 | EX. 23 | EX. 24 |
|---|---|---|---|
| g. polymer-A | 125 | 125 | 125 |
| g. polymer-B | 11.0 | 11.0 | 11.0 |
| g. organic solvent | none | MIBK/18 MP/18 | none |
| g. carbon dioxide | none | none | 37 |
| pressure, PSI | 14.7 | 14.7 | 1200 |
| temperature, °C. | 55 | 55 | 55 |
| pot-life | 35 min. | 3-4 hrs. | 2 hrs. 30 min. |

We claim:

1. A process for inhibiting chemical reaction of a fluid functionally reactive organic material selected from a group consisting of:
   a) one or more monomers;
   b) one or more monomers and one or more oligomers or polymers; and
   c) one or more oligomers and one or more polymers
   said process comprising:
   i) supplying said functionally reactive organic material;
   ii) supplying a supercritical or near supercritical fluid;
   iii) mixing the fluid functionally reactive organic material and the supercritical or near supercritical fluid;
   iv) inhibiting the reaction of the functionally reactive organic material for as long as the mixture of the functionally reactive organic mixture and the supercritical or near supercritical fluid are maintained under supercritical or near supercritical conditions;

v) removing the supercritical or near supercritical fluid conditions thereby allowing the functionally fluid organic material to react.

2. A process for restraining a chemical reaction so that the reaction can be made to occur according to a predetermined but different-from-normal pattern, that occurs between functionally reactive organic materials selected from a group consisting of:
   a) one or more monomers;
   b) one or more monomers and one or more oligomers and polymers;
   c) one or more oligomers and one or more polymers said process comprising:
      i) supplying said functionally reactive organic material;
      ii) supplying a supercritical or near supercritical fluid;
      iii) mixing the fluid functionally reactive organic material and the supercritical or near supercritical fluid;
      iv) restraining the reaction of the functionally reactive organic material for as long as the mixture of the functionally reactive organic mixture and the supercritical or near supercritical fluid are maintained under supercritical or near supercritical conditions; and
      v) removing the supercritical or near supercritical fluid conditions thereby allowing the functionally fluid organic material to react.

3. The process of claim 1 wherein the supercritical or near supercritical fluid is carbon dioxide.

4. The process of claim 2 wherein the supercritical or near supercritical fluid is carbon dioxide.

5. The process of claim 1 wherein the reaction involves a reaction injection molding composition.

6. The process of claim 1 wherein the reaction involves a fiber reinforced plastic composition.

7. The process of claim 1 wherein the functionally reactive organic material is capable of forming a coating on a substrate.

8. The process of claim 7 wherein the functionally reactive organic material is a polyurethane.

9. The process of claim 7 wherein the reaction involves an acrylic composition.

10. The process of claim 7 wherein the reaction involves an epoxy composition.

11. The process of claim 1 wherein the functionally reactive organic material comprises an amine and a second material which is reactive with the amine.

12. The process of claim 5 wherein an organic polyisocyanate and polyol are preblended prior to injection molding.

13. The process of claim 12 wherein the preblend has an extended pot-life as compared to the pot-life in the absence of supercritical or near supercritical fluid.

* * * * *